(12) United States Patent
Moore et al.

(10) Patent No.: US 8,692,521 B2
(45) Date of Patent: Apr. 8, 2014

(54) METHOD AND APPARATUS FOR CONTROLLING TORQUE ON THE SHAFT OF A GENERATOR

(75) Inventors: Gareth E Moore, Nottingham (GB); Jason E Hill, Newcastle Upon Tyne (GB); Seamus D Garvey, Nottingham (GB)

(73) Assignee: Rolls-Royce PLC, London (GB)

( * ) Notice: Subject to any disclaimer, the term of this patent is extended or adjusted under 35 U.S.C. 154(b) by 417 days.

(21) Appl. No.: 13/268,271

(22) Filed: Oct. 7, 2011

(65) Prior Publication Data
US 2012/0104842 A1 May 3, 2012

(30) Foreign Application Priority Data
Oct. 28, 2010 (GB) ................................ 1018220.2

(51) Int. Cl.
*H02P 9/00* (2006.01)
(52) U.S. Cl.
USPC .............................................. 322/17; 322/37
(58) Field of Classification Search
USPC ...................................................... 322/17, 37
See application file for complete search history.

(56) References Cited

U.S. PATENT DOCUMENTS

| 6,323,625 | B1* | 11/2001 | Bhargava ........................ 322/32 |
| 8,427,117 | B2* | 4/2013 | Trainer et al. ................... 322/58 |
| 2006/0087124 | A1 | 4/2006 | Stahlkopf | |
| 2006/0244425 | A1 | 11/2006 | Sihler | |
| 2008/0012512 | A1 | 1/2008 | Kawakami et al. | |
| 2008/0150483 | A1 | 6/2008 | Morita et al. | |
| 2010/0231045 | A1 | 9/2010 | Collins et al. | |

FOREIGN PATENT DOCUMENTS

| EP | 1 022 838 A2 | 7/2000 |
| EP | 2 154 782 A1 | 2/2010 |
| JP | A-2002-118970 | 4/2002 |

OTHER PUBLICATIONS

Jan. 9, 2012 European Search Report issued in European Application No. 11 18 4282.

* cited by examiner

*Primary Examiner* — Nicholas Ponomarenko
(74) *Attorney, Agent, or Firm* — Oliff PLC

(57) ABSTRACT

This invention relates to a method of controlling torque oscillations in a mechanical drive train of an electrical generation system which provides electrical power to an isolated electrical network, the method including the steps of: a. monitoring for changes in the electrical condition of the electrical network; b. determining whether a change in the electrical condition of the network falls within a predetermined range; c. adjusting the power in the network using an auxiliary power source when the electrical condition of the network falls within the predetermined range so as reduce or substantially prevent the build up of torque oscillations in the mechanical drive train.

14 Claims, 2 Drawing Sheets

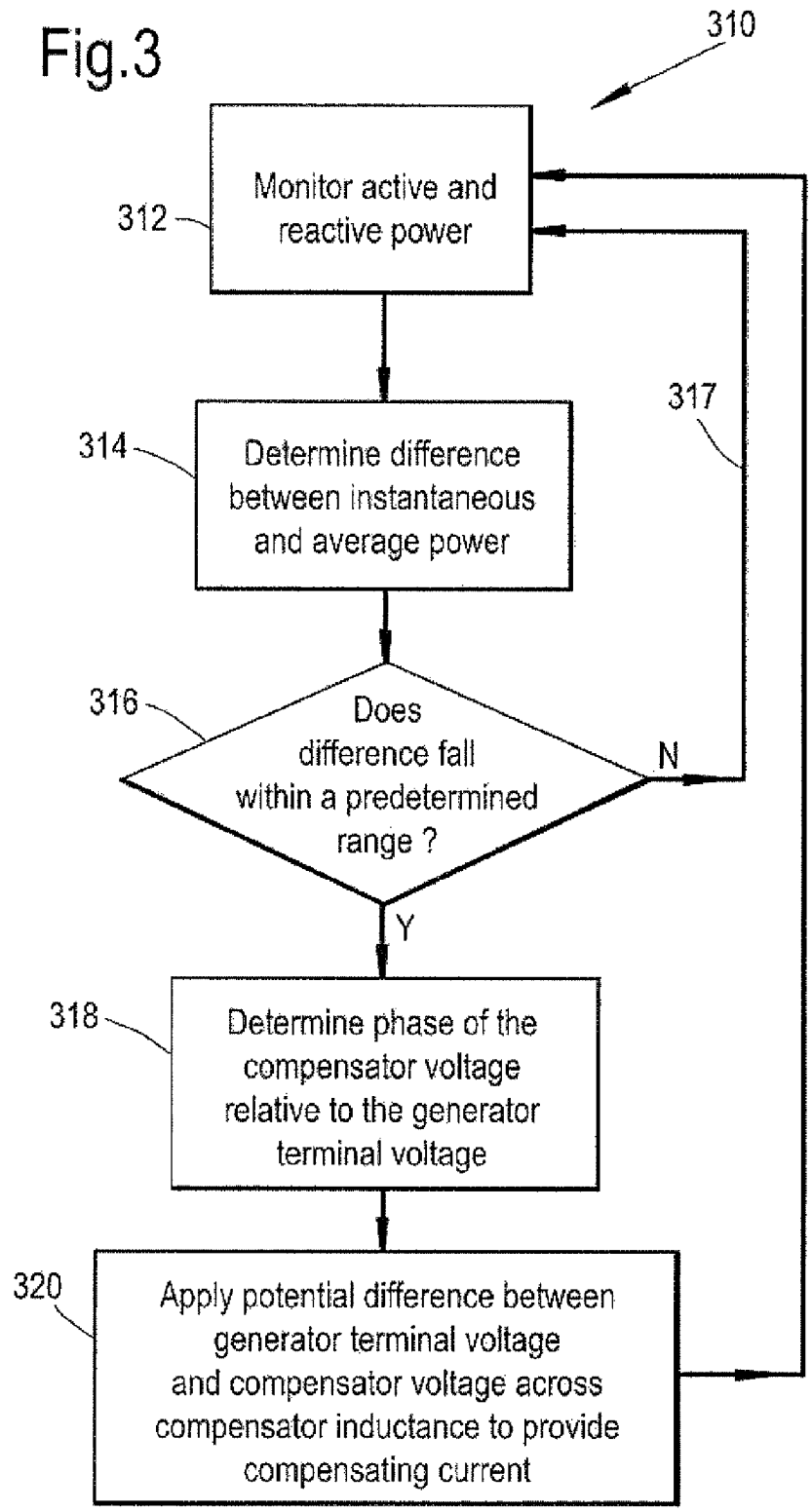

METHOD AND APPARATUS FOR CONTROLLING TORQUE ON THE SHAFT OF A GENERATOR

The present invention relates to a method and apparatus for controlling torque oscillations in the shaft of an electrical generator. In particular, this invention is concerned with electrical generation systems for isolated electrical networks such as those found in aero gas turbine engines.

Aero engines are required to generate large amounts of electrical energy for use in the aircraft systems. Typically, an aero engine electrical system will include a generator mechanically coupled to a rotating spool of the gas turbine engine by a mechanical drive train. Hence, when an electrical load is switched in and out of circuit, the electrical generator reacts to meet the change in demand and a change in torque on the mechanical drive train occurs.

Mechanical drive trains used in aero engines generally include several shafts and gearboxes so as to couple the generator to the aero engine in a desired manner. Typically, these mechanical drive trains can accommodate small variations in torque. However, modern aircraft are increasingly using large, non-linear and pulse loads which can, in certain circumstances, result in damaging torque oscillations in the mechanical drive train.

The present invention seeks to provide a technique for controlling, reducing or eliminating torque oscillations caused by the switching of electrical loads.

In a first aspect, the present invention provides a method of controlling torque oscillations in a mechanical drive train of an electrical generation system which provides electrical power to an isolated electrical network, the method including the steps of: a. monitoring for changes in the electrical condition of the electrical network; b. determining whether a change in the electrical condition of the network falls within a predetermined range; c. adjusting the power in the network using an auxiliary power source when the electrical condition of the network falls within the predetermined range so as reduce or substantially prevent the build up of torque oscillations in the mechanical drive train.

The method of the invention allows the electrical condition of an isolated electrical network to be closely monitored and any deficiency to be corrected independently from the generator. This allows changes in load condition to be corrected without having to wait for the generator to react. Correcting for a change in load conditions via the generator can cause delays in the correction due to the electrical and mechanical inertia in the generator. That is, the time constant of the system is large which can inhibit the way it can be controlled.

It is to be understood that the term "isolated electrical network" refers to an electrical network which is not part of a larger grid network. By grid network, it is meant a network in which the voltage or current is rigid, that is, at a fixed level. The isolated network can have one or more generators. The isolated network may be part of a vehicle. Preferably, the isolated electrical network is the electrical network within an aircraft. Preferably, the one or more generators are within one or more of the aeroengines of the aircraft.

The step of adjusting the power in the network can be carried out using a compensator. The compensator can include a network interface. The compensator can include a converter. The compensator can include the auxiliary power supply. The compensator can include a controller. Two or more of the network interface, convertor, auxiliary power supply and controller may be co-located. Alternatively, one or more of the network interface, convertor, auxiliary power supply and controller may be remote from the other components of the compensator. For example, the generator, convertor and controller may be located within a gas turbine engine of an aircraft, whilst the auxiliary power supply is located within the body of the aircraft.

The electrical condition can include any of the following either alone or in combination: the voltage on the network, the current being drawn by the network, the active power and the reactive power. Hence, monitoring for changes in the electrical condition of the electrical network can include monitoring the active power and reactive power being drawn by the network.

The predetermined range can include either or both a range of voltage and current. The predetermined range can be defined by a single threshold value where the range is any value above the threshold or alternatively, below the threshold value. The threshold value can be a range of values in itself.

The generator can be a wound field synchronous generator.

The method can further comprise repeating steps a to c. Hence, the compensation provided by the method can form part of a feedback system.

Adjusting the power in the network may include adding power or removing power. The method may include the compensator adding power to the network from an auxiliary power supply. Alternatively, if power is to be taken from the network, the compensator can be used to charge the auxiliary power supply. Alternatively, the power taken from the network can be dissipated in an electrical power sink. The power sink can be a bank of resistors, for example.

Monitoring for changes and determining whether a monitored change in the power drawn by the electrical network falls within a predetermined range can include detecting the instantaneous power, determining the average power over a predetermined time period and determining from the instantaneous power and average power whether compensation is required.

The method can include monitoring the electrical network for transient load changes. Monitoring the instantaneous and average power in the electrical network allows transient load conditions to be detected and compensated for before the load change affects the mechanical system.

The predetermined time period can correspond to a number of electrical cycles. For example, for a 400 Hz electrical network it may be advantageous for the compensation to be applied within 10 cycles, which equates to approximately 0.025 seconds. The predetermined time period for determining the average power is in the range of approximately 0.01 to 0.05 s. Preferably, the predetermined time period is 0.025 s.

The electrical generation system can include a wound field synchronous generator. The electrical generator system can include a primary control system. The compensator can be part of an auxiliary control system. The method can further comprise the steps of: monitoring the voltage in the electrical network local to the generator with the primary control system; determining when the voltage in the electrical network falls outside of a predetermined range; and, adjusting the magnetising current in the field winding of the generator so as to bring the voltage back towards the predetermined range.

Steps a. to c. may be carried out before the magnetising current is adjusted in response to the primary control system detecting a voltage drop in the electrical network.

In a second aspect the present invention provides an electrical generation system for providing electrical power to an isolated electrical network, comprising: an electrical generator; an auxiliary power source; and, a controller which is configured to monitor the electrical condition of the electrical network and adjust the power within the electrical network using power from the auxiliary power source.

The controller can be a compensator. The compensator can include a network interface. The compensator can include a converter. The compensator can include the auxiliary power supply. The compensator can include a compensator controller. Two or more of the network interface, convertor, auxiliary power supply and compensator controller may be co-located. Alternatively, one or more of the network interface, convertor, auxiliary power supply and compensator controller may be remote from the other components of the compensator, For example, the generator, convertor and compensator controller may be located within a gas turbine engine of an aircraft, whilst the auxiliary power supply is located within the body of the aircraft.

The generator can be a wound field synchronous generator.

The electrical generation system can further comprise a primary control system configured to detect a change in the network voltage local to the generator and adjust the magnetising current in the field winding of the generator to compensate for the change in voltage.

The auxiliary power supply is one taken from the group comprising a battery, a capacitor, a super capacitor, an ultra capacitor or an inductor. The inductor may be a wound inductor. The skilled person will appreciate that the auxiliary power supply can include other alternatives.

In a third aspect, the present invention provides a gas turbine engine comprising the electrical generation system of the second aspect.

In a fourth aspect, the present invention provides a vehicle comprising the electrical generation system of the second aspect. The vehicle can include the gas turbine engine of the third aspect.

An embodiment of the invention will now be described with the aid of the following Figures in which:

FIG. 3 shows a flow diagram of the embodiment

Figure 1:
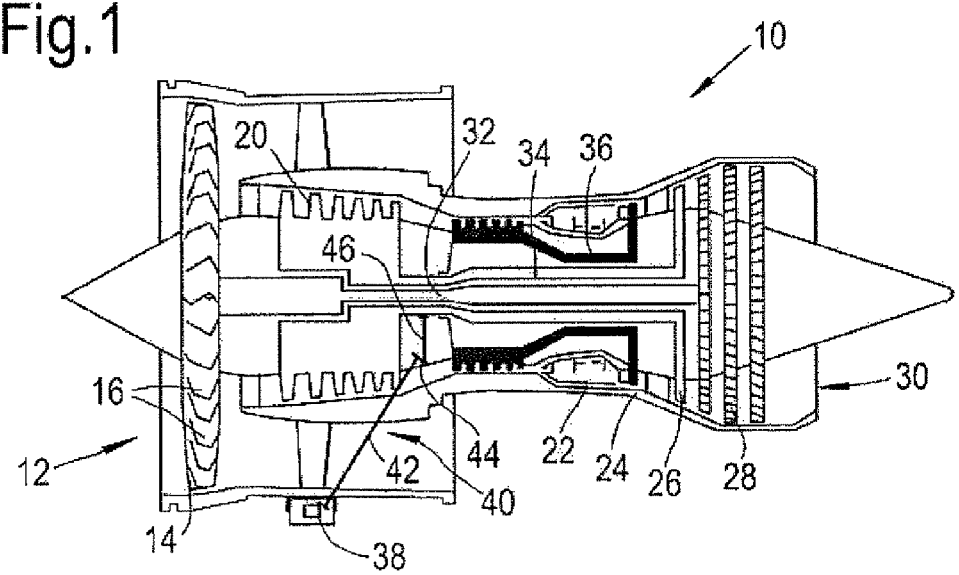
FIG. 1 shows a cross section of a conventional aero engine

Referring to FIG. 1, a gas turbine engine is generally indicated at 10 and comprises, in axial flow series, an air intake 12, a propulsive fan 14 having blades 16, an intermediate pressure compressor 18, a high pressure compressor 20, a combustor 22, a turbine arrangement comprising a high pressure turbine 24, an intermediate pressure turbine 26 and a low pressure turbine 28, and an exhaust nozzle 30.

The gas turbine engine 10 operates in a conventional manner so that air entering the intake 12 is accelerated by the fan 14 which produces two air flows: a first air flow into the intermediate pressure compressor 18 and a second air flow which provides propulsive thrust. The intermediate pressure compressor 18 compresses the air flow directed into it before delivering that air to the high pressure compressor 20 where further compression takes place.

The compressed air exhausted from the high pressure compressor 20 is directed into the combustor 22 where it is mixed with fuel and the mixture combusted. The resultant hot combustion products then expand through, and thereby drive, the high, intermediate and low pressure turbines 24, 26 and 28 before being exhausted through the nozzle 30 to provide additional propulsive thrust. The high, intermediate and low pressure turbines 24, 26 and 28 respectively drive the high and intermediate pressure compressors 20 and 18 and the fan 14 by suitable interconnecting shafts 32, 34, 36.

Electrical power for the aero engine and aircraft systems is generated by a wound field synchronous generator 38. The generator 38 is driven via a mechanical drive train 40 which includes an angle drive shaft 42, a step aside gearbox 44 and a radial drive 46 which is coupled to the high pressure compressor 34 via a geared arrangement.

Typically, the mechanical drive train 40 shown in FIG. 1 will have a number of resonant frequencies due, for example, to the relatively long thin construction of the radial 46 and angle 42 shafts. These resonant frequencies can, under certain circumstances, be excited by a change in electrical load experienced by the generator 38 and the way in which existing control systems govern the generator 38 to maintain the voltage in the electrical network within a predetermined range. This can occur for example, when the applied control techniques fail to correctly react to the changes in load or do not react with sufficient speed. In this instance, compensation can be applied during the wrong time interval and at an incorrect amount which leads to torque oscillations in the generator 38 rotor and mechanical drive train 40. These oscillations can coincide with the resonant frequencies of the drive train 40 which can result in damage to both the drive train 40 and the generator 38. The skilled person will appreciate that the nature of the problem is heavily dependent on the electrical and mechanical system which is utilised.

The invention advantageously provides a control system which is ideally placed within the electrical network to react quickly and efficiently to changes in the electrical load. Further, the control system is configured to react independently from the generator 38 thereby avoiding the time delay which may be associated with the inertia in the mechanical drive train 40 and the inductance of electrical generator 38 and associated excitation components.

Figure 2:
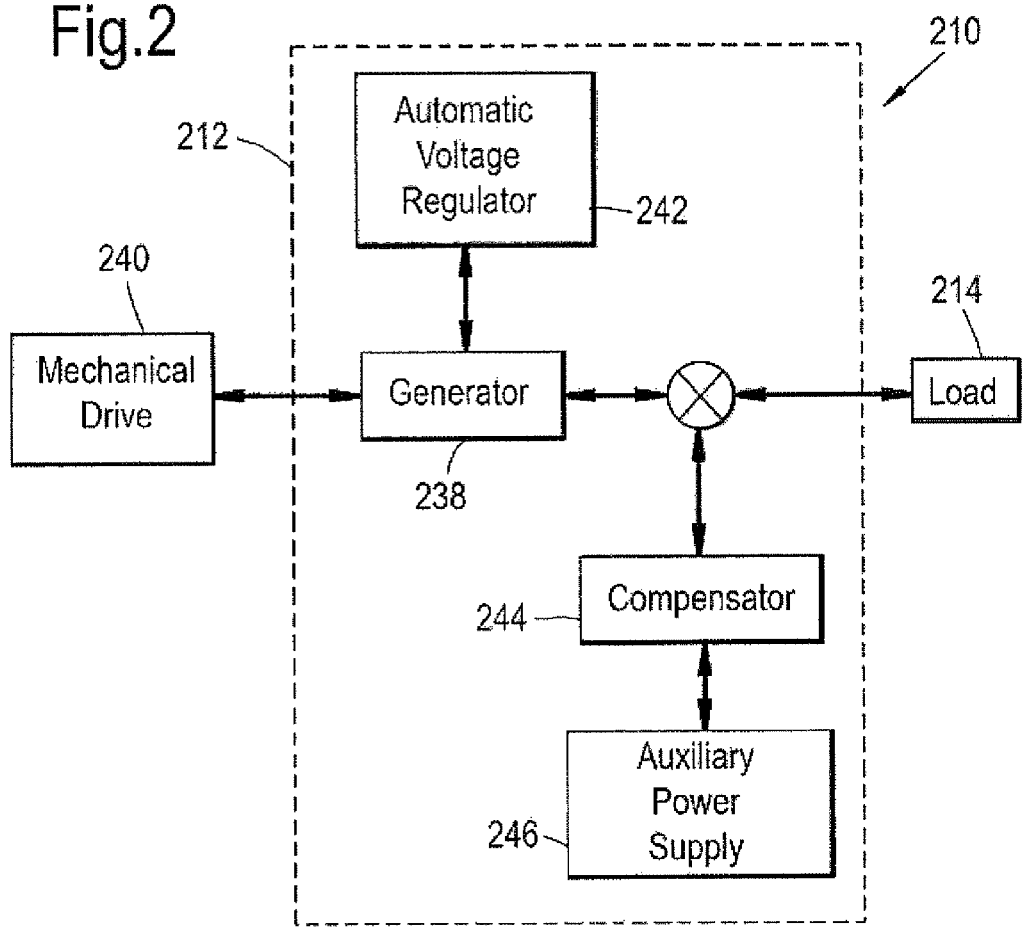
FIG. 2 shows a schematic of the electrical system of the embodiment

FIG. 2 shows a schematic arrangement of the electrical system architecture of the present invention. The electrical system 210 includes an electrical generation system 212 which is coupled to an electrical network represented as the load 214. The electrical generation system 212 is mechanically driven by the mechanical drive train 240 described above.

The electrical generation system 212 includes four major components. A generator 238 in the form of a wound field synchronous generator, a primary control system in the form of an automatic voltage regulator 242, an controller in the form of a compensator 244, and an auxiliary power supply 246 in the form of a wound inductor.

The field windings of the synchronous generator are fed from a brushless exciter (not shown) which is mounted on the same shaft as the rotor of the generator. The brushless exciter is excited from a pilot exciter (not shown) which is also mounted on the rotor shaft. This arrangement is well known in the prior art.

The automatic voltage regulator, AVR, 242 monitors and regulates the voltage in the electrical network 214. If the voltage on the generator 238 terminals falls outside of a predetermined range, the AVR 242 sends a control signal to the main exciter so as to increase the magnetising current in the rotor windings of the generator 238. For example, if a load is connected to the generator 238 the electrical network experiences a voltage droop which is detected by the AVR 242. The AVR 242 provides the main exciter with a correcting voltage, typically a DC voltage, such that the magnetising current in the rotor windings of the generator increases and the power output of the generator 238 compensates for the change in load condition. This is a continuous process in which the AVR 242 continually monitors the voltage at the generator 238 terminals.

The use of an AVR 242 works well if the load changes are small and only include relatively slow transients. However, a problem can exist when large loads are switched in and out of the electrical network 242 or when loads are pulsed or non-linear. This is because the AVR 242 control loop includes several components i.e. the AVR, the main exciter, the generator rotor windings and the stator windings, and as a consequence is slow to react to changes in the electrical load. Hence, if a large load is pulsed for example, the AVR 242 can fail to react quickly enough. This may result in the magnetising current being applied at the wrong time or by the wrong amount which can result in the system becoming unstable and oscillations occurring in the rotor of the generator and the mechanical drive train 240.

Hence, the present invention provides a control system in the form of the compensator 244 which operates independently from the generator to compensate for power fluctuations in the electrical network 214 before they can cause oscillations in the mechanical drive train 240. Specifically, the compensator 244 monitors the electrical condition of the network 214 local to the terminals of the generator 238 and adds or removes power from the network using an auxiliary power supply 246 as a source or sink as required. Although the auxiliary power source is shown as a separate entity in the embodiment this is not necessarily the case and the term compensator can be taken to include the auxiliary power source in some instances.

The use of the compensator 244 in this way allows the voltage to be monitored directly and power to be fed into the network 214 independently of the generator 238. The compensator 244 is configured to work in conjunction with the AVR 242 such that the compensator 244 only reacts to transient conditions which are not within the range which can be adequately controlled by the AVR 242. This saves using the auxiliary power supply unnecessarily which allows its size to be reduced.

The compensator of the embodiment is a shunt compensator. The compensator includes a network interface which is in electrical communication with the electrical network. The compensator 244 includes a compensator controller which monitors the voltage on the generator terminals for transients. If there are transients, the compensator controller determines whether they fall outside a predetermined range, and, if they do, the compensator adds power to or removes power from the network using the auxiliary power supply 246. In the present embodiment, the range is predetermined on the basis of response capability of the AVR 242.

FIG. 3 provides an embodiment of the control method 310 which corresponds to an increase in electrical load on the network in which more current is being drawn from the supply. However, the skilled person will appreciate that the method of the invention is equally applicable to reduction in load where excess power is generated.

The compensator controller monitors for changes in the electrical condition of the electrical network using the reactive and active power measured local to the generator terminals 312. Next, the difference between the instantaneous power and the average power (calculated over approximately 0.025 seconds) is determined 314 such that a transient change in the electrical load can be detected and the system can react to compensate for the change prior to the load change causing a significant voltage droop in the electrical network.

The difference in the instantaneous and average power is compared with a predetermined range 316. The predetermined range represents a transient in the electrical load which the AVR cannot correct for, If the difference is within this range the cycle returns 317 to step 312. If the difference is outside of the predetermined range, the compensator controller determines the generator terminal voltage and relative phase of compensator terminal voltage 318. The difference in the potential between the generator terminal voltage and the voltage at the terminals of the compensator is then placed across an inductance which forms part of the compensator 320. This provides a current into the electrical network which acts to bring the voltage back toward the predetermined range.

The electrical condition of the network is continually monitored. Hence, if an initial injection of current was not sufficient to control or damp a given to transient caused by a load increase (or decrease), this will be detected and reacted to accordingly. In this way, the load changes are dealt with in small iterations of current injection rather than the system trying to predict the load change from the initial transient response of the network.

The skilled person will appreciate that the above embodiment is provided as an example of the broader inventive concept only. For example, the above embodiment is predominantly described with regard to an increase in electrical load and an additional supply of current to the network. However, the skilled man will appreciate that a reduction in demand in the network can result in the compensator feeding excess charge back into the auxiliary power supply, or dissipating the excess power in a suitable device.

Although the power control method described above involved placing a voltage across an inductor in the compensator, the skilled person will appreciate that the compensator could be configured to provide a voltage in series with the generator terminals or elsewhere.

The invention claimed is:

1. A method of controlling torque oscillations in a mechanical drive train of an electrical generation system which provides electrical power to an isolated electrical network, the electrical generation system having a primary control system and a compensator as part of an auxiliary control system, the method including the steps of:
   a. monitoring for changes in the electrical condition of the electrical network;
   b. determining whether a change in the electrical condition of the network falls within a predetermined range;
   c. adjusting the power in the network using the compensator and an auxiliary power source when the electrical condition of the network falls within the predetermined range so as reduce or substantially prevent the build up of torque oscillations in the mechanical drive train.

2. A method as claimed in claim 1 further comprising repeating steps a. to c.

3. A method as claimed in claim 1 wherein monitoring for changes in the electrical condition of the electrical network includes monitoring the active power and reactive power.

4. A method as claimed in claim 1 wherein monitoring for changes and determining whether a monitored change in the electrical condition of the electrical network falls within a predetermined range includes detecting the instantaneous power, determining the average power over a predetermined time period and determining from the instantaneous power and average power whether compensation is required.

5. A method as claimed in claim 4 wherein the predetermined time period for determining the average power is in the range of 0 to 0.025 s.

6. A method as claimed in claim 1 wherein the electrical generation system includes a wound field synchronous generator, the method further comprising the steps of:
   monitoring the voltage in the electrical network local to the generator with the primary control system;
   determining when the voltage in the electrical network falls outside a predetermined range; and, adjusting the magnetising current in the field winding of the generator so as to bring the voltage back towards the predetermined range.

7. A method as claimed in claim 6 the steps a. to c. are carried out before the magnetising current is adjusted.

8. An electrical generation system for providing electrical power to an isolated electrical network, comprising:
- an electrical generator;
- a primary control system;
- an auxiliary power source; and,
- an auxiliary control system having a compensator which is configured to monitor the electrical condition within the electrical network and adjust the power within the electrical network using power from the auxiliary power source.

9. An electrical generation system as claimed in claim 8, wherein the auxiliary power supply is part of the compensator.

10. An electrical generation system as claimed in claim 8 wherein the generator is a wound field synchronous generator.

11. An electrical generation system as claimed in claim 8 wherein the primary control system is configured to detect a change in the network voltage local to the generator and adjust the magnetising current in the field winding of the generator to compensate for the change in voltage.

12. An electrical generation system as claimed in claim 9 wherein the auxiliary power supply is one taken from the group comprising a battery, a capacitor, a super capacitor, an ultra capacitor or an inductor.

13. A gas turbine engine comprising the electrical generation system as claimed in claim 8.

14. A vehicle comprising the electrical generation system as claimed in claim 8.

* * * * *